United States Patent [19]
Lantz

[11] 3,915,266
[45] Oct. 28, 1975

[54] IN AXLE WHEEL SPEED SENSOR FOR ANTI-SKID BRAKE CONTROL

[75] Inventor: Charles H. Lantz, Troy, Ohio

[73] Assignee: The B. F. Goodrich Company, Akron, Ohio

[22] Filed: Jan. 27, 1975

[21] Appl. No.: 544,352

[52] U.S. Cl. ............................ 188/181 R; 310/168
[51] Int. Cl.² ............................................ B60T 8/02
[58] Field of Search ................... 188/181 A, 181 R; 200/61.46; 303/21 CG, 21 CE, 21 CF; 310/168, 171

[56] References Cited
UNITED STATES PATENTS
3,683,219   8/1972   Kruse.............................. 310/168

Primary Examiner—Duane A. Reger
Attorney, Agent, or Firm—Harry F. Pepper, Jr.; W. A. Shira, Jr.

[57] ABSTRACT

A wheel speed sensor for use in a vehicle anti-skid system can be mounted in an axle of a vehicle where optimal operating conditions exist. The sensor comprises a rotor, stator, permanent magnet and coil all contained within a housing adapted for fitting to an axle. The sensor is also adapted for connection to a hubcap or wheel cover such that the rotor rotates with the same angular frequency as the wheel, thereby generating an electric signal proportional to the speed of the wheel.

8 Claims, 4 Drawing Figures

IN AXLE WHEEL SPEED SENSOR FOR ANTI-SKID BRAKE CONTROL

Many vehicles employ automatic electro-mechanical systems to prevent skids due to application of braking pressure by the operator. These "anti-skid" systems are usually comprised of sensing devices, electronic circuits, and mechanical means such as valves to regulate braking fluid pressures. In broad outline, a sensor transmits wheel velocity information to the electronic circuit which computes the proper brake pressure in response to that information. Under appropriate conditions, the electronic control circuit will activate relief valves which proportionately alter the braking pressure to either take the wheels out of a skid or to prevent the wheels from reaching skid conditions. From the input provided from the sensing devices, it is possible for the system to continually monitor braking pressure to maintain the maximum pressure possible without producing a skid.

Thus, it is seen that a critical element in an anti-skid braking system is the sensor. A sensor usually consists basically of a rotor, stator, magnet and coil. The rotor and stator usually have a corresponding plurality of circumferentially spaced notches or teeth aligned a small distance apart with the magnetic field of the magnet member symmetrical with respect to the rotor axis of rotation. When the rotor and stator teeth are in the same angular position, the flux lines pass through the stator to the rotor. However, when the teeth positions are angularly different, the flux field collapses around the coil producing a voltage pulse. Because the frequency of voltage pulse is directly proportional to the speed of the rotor, and since the rotor turns at the same speed as the wheel, the frequency of the AC signal carried to the electronic circuit is directly proportional to the speed of the wheel.

How and where a sensor is disposed in relation to the vehicle wheel or wheels are important considerations affecting the design, cost and efficiency of the sensor. Sensors have been mounted in, at or adjacent to the brake drums associated with a wheel. This location has proven problematical in two primary respects. First, the extreme dirt and temperature conditions produced alignment problems between the rotor and stator. Second, removal of the assembly for replacement or repair required removal of both the wheel and brake drum. Attempts at mounting sensor assemblies in or at the end of wheel axles have not enjoyed much greater success. Such "in-axle" type sensors are usually too cumbersome or heavy to be practical or, if sufficiently compact and lightweight, are high in cost due to more sophisticated designs of the various components or the need to add certain auxiliary components.

SUMMARY OF THE INVENTION

A compact, relatively inexpensive sensor which produces an electromagnetic signal proportional to the speed of a rotating wheel is adapted to be mounted in the axle of a vehicle. The sensor comprises a lightweight housing having several portions of a generally cylindrical shape. Mounted within the housing is an annular ferromagnetic stator, an annular conductive coil with suitable leads in insulated arrangement with the stator, an annular permanent magnet within the coil assembly, and an annular disc-like ferromagnetic rotor. Driving means on the sensor connect the rotor to a hubcap or wheel cover so that the rotor turns at the same angular frequency as the wheel to which the hubcap is connected. A portion of the housing is adapted for mounting within the end of a hollow axle such that the hollow part of the axle is sealed, preventing entrance of foreign matter into the axle thereby protecting leads from the sensor passing within the axle to further electrical circuitry comprising the antiskid system.

DETAILED DESCRIPTION

Figure 1:
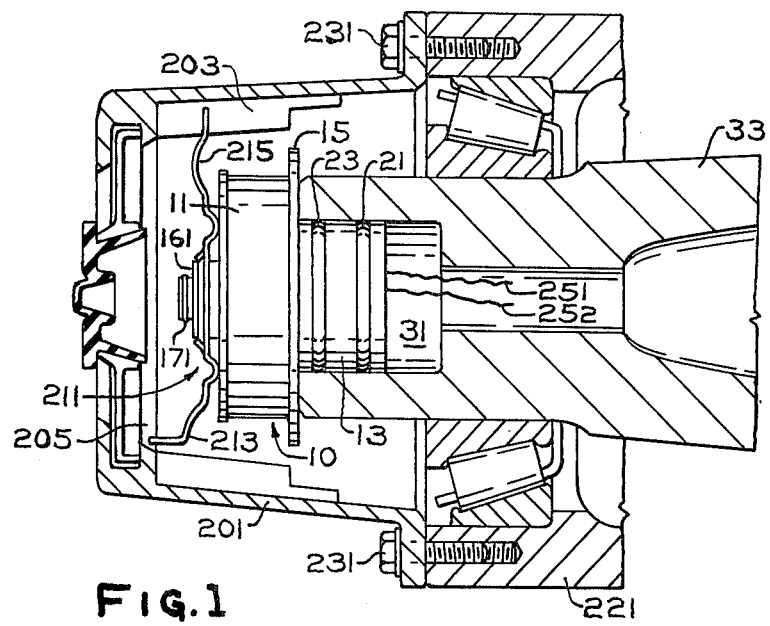
FIG. 1 is a partially cross-sectioned axial view of a sensor shown mounted upon a wheel supporting axle.
Figure 2:
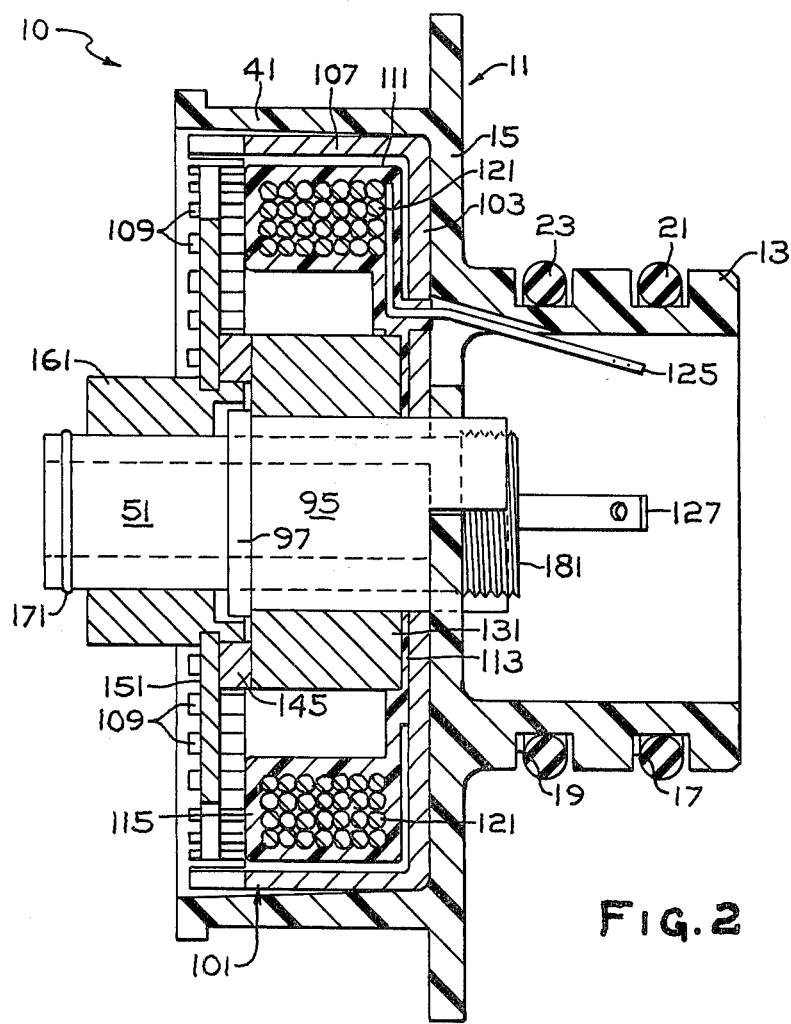
FIG. 2 is an enlarge sectional view of the sensor, according to a preferred embodiment.
Figure 3:
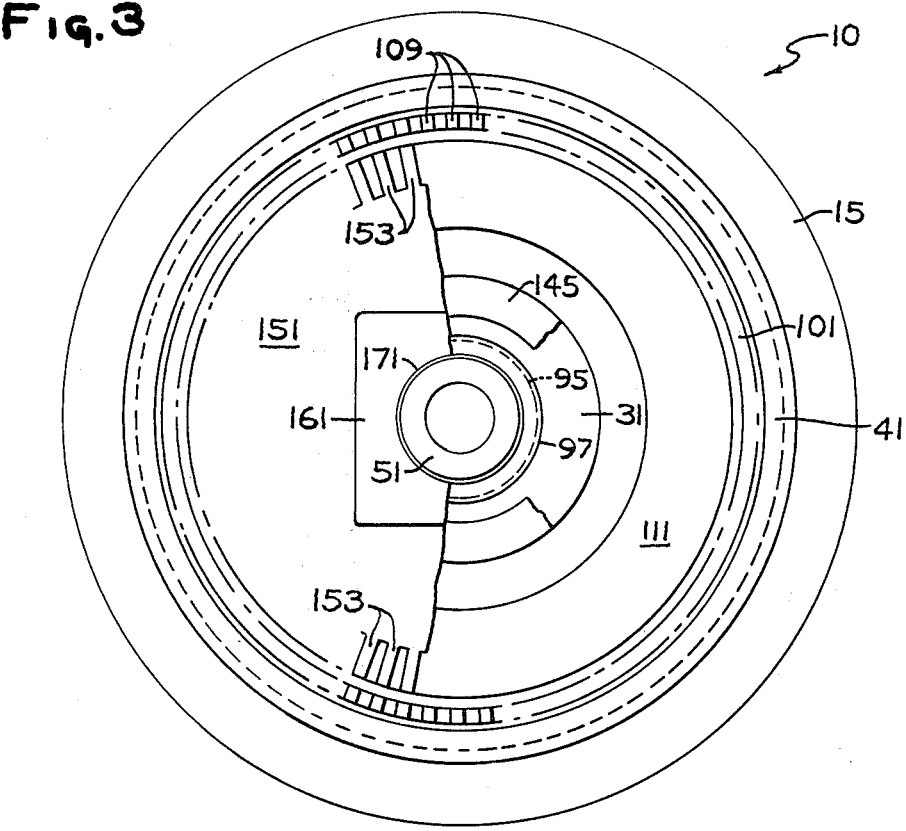
FIG. 3 is a view of a portion of the sensor of FIG. 2 facing away from the wheel.

A preferred embodiment of a sensor according to the invention is generally referenced 10 in the accompanying drawing. The sensor 10 comprises a housing 11 preferably made of rigid lightweight molded or easily machined material such as plastic or aluminum. The housing 11 has a plurality of concentric generally cylindrical portions comprising an annular disc portion 15, an annular axle engaging portion 13, an annular enclosure portion 41, and an annular sleeve receiving portion 51.

The axle engaging portion 13 extends axially from disc 15, which has a greater diameter than the axle engaging portion so that the outer periphery of the disc serves as a flange. The axle engaging portion may have grooves 17, 19 which receive a corresponding number of elastomeric O-ring sealing members 21, 23. The outer diameter of the axle engaging portion 13 is such that it will fit snugly into the opening 31 at the end of a vehicle axle 33 so that the O-rings 21, 23 form a seal.

The enclosure portion 41 of the housing 11 extends axially from the opposite side of the disc portion 15 than the axle engaging portion 13. Although not necessary to the function of the sensor 10, enclosure 41 has a larger diameter than that of the axle engaging portion 13. Radially inwardly of enclosure portion 41 is sleeve receiving portion 51 which extends axially in the same direction as enclosure portion 41. The sleeve receiving portion of the housing has a smaller outer diameter than the inner diameter of the enclosure so that a donut shaped cavity is defined by the enclosure and sleeve receiving portions.

Figure 4:
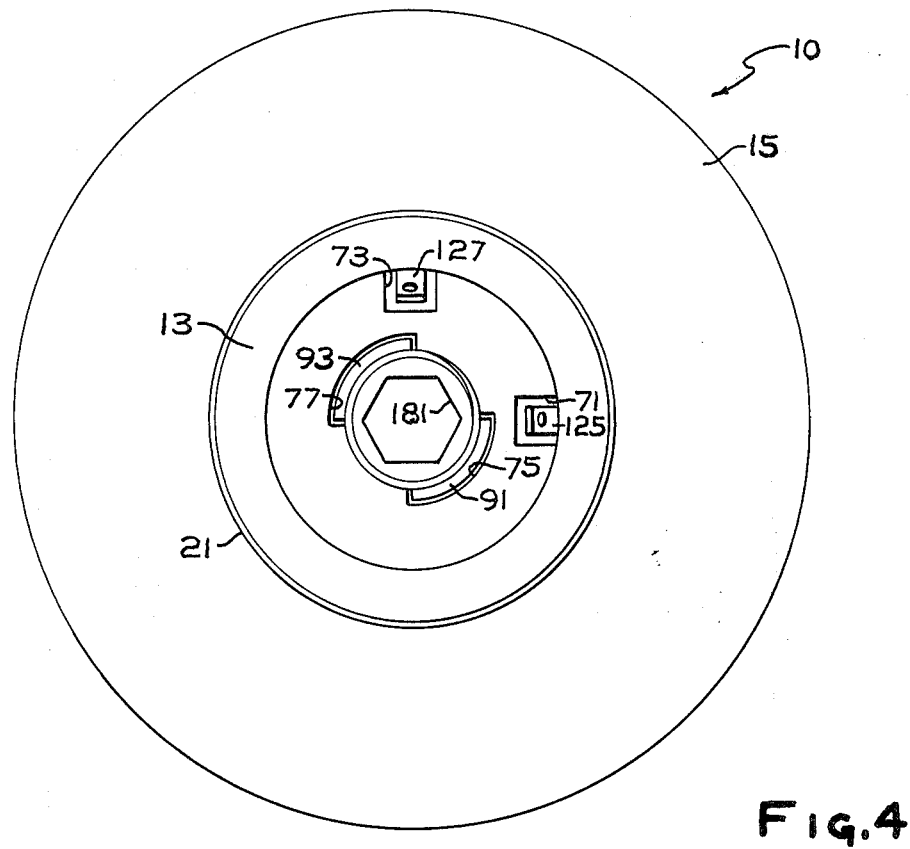
FIG. 4 is a view of a portion of the sensor of FIG. 2 facing the axle.

The disc portion 15 includes several openings on the section of the disc 15 which lies radially inwardly of the enclosure portion 41. Although not critical to the invention, there are four such openings 71, 73, 75, 77 shown best in FIG. 4. Openings 71 and 73 permit leads 127, 125 from the coil 121 to project through the disc 15 and into the cavity defined by the inner circumference of the axle engaging portion 13 of the housing 11. Opening 75 and 77 are adjacent the sleeve receiving portion 51 and are crescent shaped. These openings receive threaded projections 91, 93 of the cylindrically shaped anchoring sleeve 95 which is mounted directly upon sleeve receiving portion 51 of the housing 11. While examples of the shape and location of the above-mentioned openings are given, the invention is not limited to the specific configurations disclosed.

An annular ferromagnetic stator 101 is mounted over the sleeve receiving portion 51 and lies adjacent the disc 15 and inner side of the enclosure portion 41 of the housing. The stator 101 has a flat disc-like portion 103 which has a diameter slightly smaller than that of the enclosure portion 41 of the housing and a centrally located opening with a diameter which is greater than the outer diameter of the sleeve 95. The disc-like portion 103 also has openings (not shown) which correspond in size and location to openings 71, 73, 75, 77 in the housing. At the outer periphery of the disc-like portion 103 and integrally connected thereto is an annular axially extending portion 107 so that the stator is generally shaped like a cup. At the outer end of the annular portion 107 are equally spaced slots forming teeth 109.

The coil assembly consists of a rigid insulation 111 surrounding an annularly wound coil 121 positioned adjacent to and insulated from the annular portion 107 of the stator 101. The coil insulation 111 has a disc-shaped portion 113 having a central opening for mounting over the sleeve receiving portion 51 of the housing 11 and which is large enough to receive the sleeve 95. The remaining annular portion 115 of insulation 111 has a generally cylindrical shape and contains coil 121 comprising conductive wire wound in a manner well known to the art. Projecting from coil 121 are two leads 125, 127 which are positioned to match the openings 71, 73 in the disc portion 13 of housing 11 and corresponding openings in the stator 101. The leads 125, 127 are insulated from contact with the stator 101. When mounted in the sensor 10, the disc-shaped portion 113 of the coil assembly 111 is adjacent the disc-like portion 103 of the stator 101. The annular portion 115 of the coil assembly is adjacent the annular portion 107 of the stator 101.

The disc-shaped portion 113 also has a recessed portion 117 on which an annular, permanent magnet 131 is mounted. The magnet also has a central opening which has a diameter greater than the outer diameter of the sleeve 95.

The sleeve 95 is mounted over sleeve receiving portion 51 of housing 11. At one end of the sleeve is a flange 97 which is of greater circumference than the central opening in the magnet 131. At the other end are two projecting portions 91, 93 which project through the openings 75, 77 in the disc 15 of the housing 11. These projecting portions have their inner sides threaded to receive a nut 181 which has corresponding threads on its outer side. When the nut 181 is screwed into the projections, the stator 101, coil assembly 111 and magnet 131 are secured to the main housing 11 by virtue of the securing force exerted by the sleeve flange 97 on the magnet 131.

An annular rotor 151 is rotatably mounted upon sleeve receiving portion 51. The rotor 151 is a ferromagnetic disc having a diameter which is slightly smaller than the diameter of the disc portion of the stator. The rotor has equally spaced teeth 153 at its circumference which are preferably equal in number and size to those on the stator. When the teeth of the rotor are in angular alignment with the teeth in the stator, a small air gap exists which is sufficient to allow the rotor to rotate without striking the teeth of the stator. However, the gap must not be too large or the electromotive force induced in the coil by the alternate alignment and misalignment of the teeth will not be strong enough to produce a reliable indication of wheel speed.

At the center of the rotor is a boss 161 having a central opening equal in size to that on the rotor and which serves as the means to connect the rotor to the hubcap 201. The boss can be attached to the rotor in any conventional manner or can be molded onto the rotor as an integral part. On the side of the rotor adjacent the magnet is a cylindrical flange 163 on which may rest upon the magnet 131. This cylindrical flange 163 of the rotor must have an inner circumference which is larger than the outer circumference of the flange portion 97 of the sleeve 95. In order to reduce friction during rotation of the rotor 151, a bearing washer 145 may be placed outward of the cylindrical portion of the disc of the rotor on the magnet. A ring 171 prevents the rotor 151 from sliding off of the mounting portion 51 of the housing.

Driving means for the rotor comprises a metal clip 211 which may be mounted upon the boss 161 by conventional means. The metal clip 211 has an arm 215 which extends into a slot 203 provided in the side of the hubcap 201. An additional arm 213 is also provided on clip 211 which is free of engagement with hubcap 201. This additional arm is useable to engage an appropriate slot formed in a differently designed hubcap or wheel cover (not shown), if used.

The hubcap 201 may be mounted upon the wheel 221 by bolts 231 or other conventional means. Thus, when the wheel 221 rotates, the hubcap will rotate causing the driving clip 211 to turn the rotor at the same angular frequency as the wheel.

What is claimed is:

1. A sensor assembly adapted to be mounted on a vehicle axle for producing an electro-magnetic signal proportional to the speed of a wheel rotatably supported on the axle, where the assembly comprises:
   A. an annular housing having a plurality of generally cylindrical portions concentrically arranged about a central axis, said portions comprising:
      1. a disc portion having one or more openings extending axially therethrough;
      2. two cylindrical portions extending in one axial direction from the disc portion comprising:
         a. a large diameter enclosure portion, and
         b. a small diameter sleeve receiving portion spaced radially inwardly from the large diameter portion to define a generally donut-shaped cavity; and
      3. an axle engaging portion extending axially from the disc portion in the direction opposite to the one direction, the axle engaging portion having at least one annular groove on its radially outer surface to receive an O-ring, the axle engaging portion adapted for sealed connection to the end of the vehicle axle;
   B. a ferromagnetic stator comprising an annular, radially extending disc-like portion and an annular cylindrical portion integrally connected to and extending axially from the disc-like portion;
      the disc-like portion having a centrally located opening having a diameter slightly larger than the outer diameter of the sleeve receiving portion of the housing,
      the disc-like portion also having one or more openings of the same size and in the same orientation with respect to the central axis as the one or more openings in the disc portion of the housing, the annular portion having axially oriented slots along the circumference of the open end which define teeth, the stator mounted in the donut-shaped cavity in the housing with the openings in its disc portion directly over the one or more openings in the disc portion of the housing;

C. a coil of conductive wire, the coil having a generally cylindrical shape and insulated from contact by insulating means with the remainder of the assembly, the coil being mounted on the stator and about the sleeve receiving portion of the housing, the outer diameter of the coil being adjacent the annular portion of the stator, the coil also having two leads which extend through the one or more openings in the disc portions of the stator and the housing;

D. an annular permanent magnet having a substantially cylindrical shape mounted radially inward of the coil and onto and in insulated arrangement with the stator over the sleeve receiving portion of the housing with the radially inside diameter approximately equal to that of the central opening in the stator;

E. a cylindrical sleeve mounted on the sleeve receiving portion of the housing, the sleeve having an inner diameter slightly larger than the outer diameter of the sleeve receiving portion of the housing and an outer diameter slightly smaller than the inner diameter of the magnet, the sleeve having a flange on one end which has an outer circumference larger than the circumference of the central opening in the magnet, the outer end having one or more projections which project through the one or more openings of the housing and stator when the sleeve is mounted over the sleeve receiving portion of the housing;

F. means to secure the one or more projections of the sleeve to the housing in a fixed arrangement;

G. an annular disc-shaped rotor having a centrally located opening of substantially the same diameter as the central opening in the disc-like portion of the stator and radially oriented slots along the circumference to define teeth.

2. The assembly in claim 1 wherein the outer diameter of the axle engaging portion is such that when the axle engaging portion is mounted in an axle, the O-rings on the axle engaging portion fit snugly against the inner wall of the axle to form a seal.

3. The assembly in claim 1 wherein the insulating means is a plastic object, one portion of the object comprising a hollow piece having a generally cylindrical shape wherein the coil occupies the hollow area, another portion of the object which is generally disc-shaped and integrally connected to and extending from the inner diameter of one end of the cylindrical portion and having a centrally located opening at least as wide as the central opening in the stator.

4. The assembly in claim 3 wherein the diameter of the central opening in the generally disc-shaped portion of the plastic object is sufficiently small so that the disc-shaped portion is in insulating arrangement between the stator and the magnet.

5. The assembly in claim 3 wherein the two leads from the coil descend outwardly from the disc-shaped portion and are provided with sufficient insulation to prevent contact with the stator.

6. The assembly in claim 1 wherein the rotor has a cylindrically shaped flange outward of the central opening and on the side of the rotor which is adjacent the magnet.

7. The assembly in claim 1 wherein the means for connecting the rotor with the wheel comprises:

a member centrally connected to the rotor and having a central opening concentric with the opening in the rotor and with a diameter at least as great as that of the opening in the rotor, the member having at least one arm extending radially of the axis of rotation of the rotor, a hubcap attached to the wheel to rotate therewith, the hubcap having at least one groove in its inner wall which is substantially parallel to the axis of rotation so that the arm member is slidingly received in the groove.

8. The assembly in claim 7 wherein the arm is removably attached to the member which is connected to the rotor.

* * * * *